Jan. 5, 1954
W. J. CONGDON ET AL
2,665,190
PURIFICATION OF WASTE GASES CONTAINING CHLORINE
BY TREATMENT WITH AN ALKALINE NITRITE
SOLUTION TO EFFECT REMOVAL OF THE
CHLORINE CONSTITUTENT THEREFROM
Filed July 28, 1950
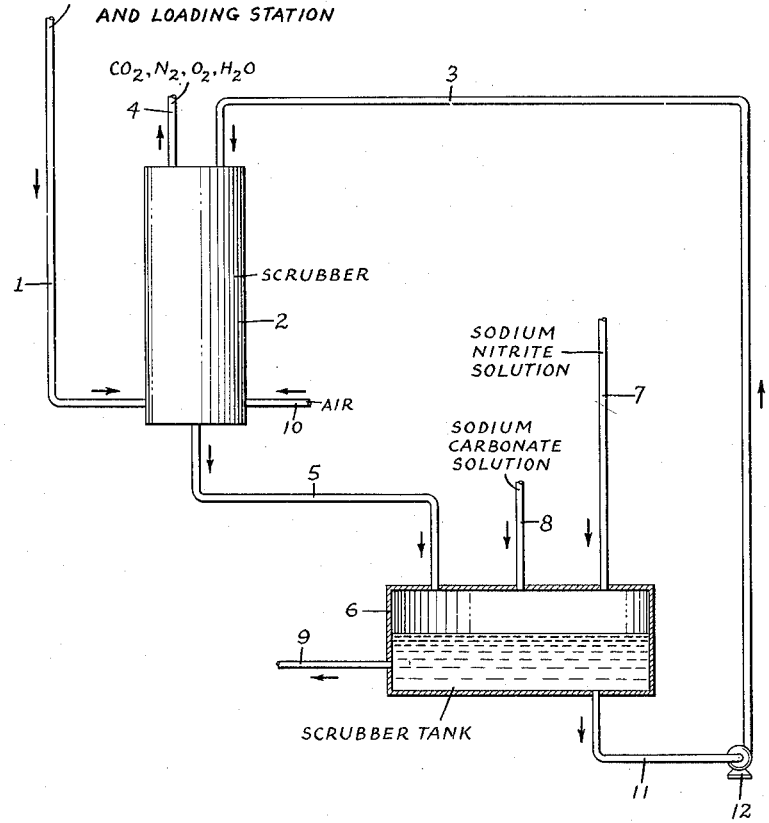
INVENTORS.
WILLIAM J. CONGDON
CHARLES F. WESTON
BY *Ernest A. Polin*
ATTORNEY.

Patented Jan. 5, 1954

2,665,190

UNITED STATES PATENT OFFICE 2,665,190

PURIFICATION OF WASTE GASES CONTAINING CHLORINE BY TREATMENT WITH AN ALKALINE NITRITE SOLUTION TO EFFECT REMOVAL OF THE CHLORINE CONSTITUENT THEREFROM

William J. Congdon, Hopewell, and Charles F. Weston, Prince George County, Va., assignors to Allied Chemical & Dye Corporation, New York, N. Y., a corporation of New York Application July 28, 1950, Serial No. 176,272

9 Claims. (Cl. 23—2)

This invention relates to a process for the treatment of gaseous mixtures containing chlorine. More particularly the invention relates to a process for the removal of chlorine from vent gases released during the manufacture of chlorine and during the loading of chlorine cylinders and tanks.

In the manufacture of chlorine by the reaction of nitric acid with a metal chloride, the system is periodically vented to the atmosphere to remove inert gases which contain in admixture therewith small amounts of chlorine. Waste gases consisting of a mixture of air and chlorine are also emitted to the atmosphere during the loading of chlorine cylinders and tanks as a result of purging these vessels. Due to the low concentration of chlorine in these waste gas mixtures, common practice in the industry is to release them into the air thereby contaminating the air with chlorine. With more stringent governmental regulation regarding air pollution and the need for conserving resources, it becomes increasingly important to eliminate and recover noxious gases from waste mixtures prior to release into the atmosphere. Unfortunately, present known methods of purifying gases, particularly waste gases containing a low concentration of chlorine, i. e. less than 20% chlorine by volume, are expensive or complicated and the industry is reluctant to adopt them, finding it cheaper and more expedient to vent the gases directly into the atmosphere.

One object of the present invention is to provide an economical and efficient method for removing chlorine from gaseous mixtures containing the same.

Another object of the invention is to provide a simple, low-cost method of purifying gas mixtures containing chlorine vented during the manufacture of chlorine and during the loading of chlorine cylinders and tanks, thus preventing pollution of the surrounding atmosphere.

A further object is to provide a method of purifying gases containing chlorine and concomitantly converting the chlorine constituent to a fixed form adaptable for further use.

Further objects and advantages of this invention will be apparent from the following description and accompanying drawing.

In general, the present invention is directed to the removal of chlorine from gas mixtures containing the same by passing the gas mixtures in intimate contact with an alkaline nitrite solution containing preferably 30 to 60 grams per liter alkali metal nitrite and having a pH above 7, preferably above 8.5, to effect substantially complete removal of the chlorine constituent from the gas mixture and fix the chlorine constituent in the solution thereby recovering the chlorine for further use.

A preferred method for carrying out the process in accordance with the present invention involves passing a waste gas mixture containing chlorine upwardly in intimate direct contact with a downwardly flowing stream of an alkaline $NaNO_2$-$Na_2CO_3$ aqueous solution containing from 30 to 60 grams per liter sodium nitrite and from 40 to 190 grams per liter of sodium carbonate at a temperature within the range of 30–85° C., preferably 65–70° C., releasing the residual gas containing substantially no chlorine after contact with the aqueous solution from the system, withdrawing the aqueous solution after contact with the gas mixture, recirculating the withdrawn aqueous solution for further intimate contact with the incoming gas mixture containing chlorine, bleeding off a small portion of the circulating aqueous solution and maintaining the concentration of the circultaing aqueous solution by the addition thereto of sodium nitrite and sodium carbonate.

While we do not wish to predicate our invention on any theory or mechanism, the following equation represents the probable reaction occurring by contact of the chlorine gas with the aqueous solution:

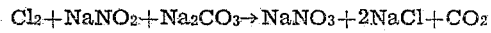

$$Cl_2 + NaNO_2 + Na_2CO_3 \rightarrow NaNO_3 + 2NaCl + CO_2$$

As seen from the above equation chlorine, sodium nitrite and sodium carbonate combine to form sodium nitrate, sodium chloride and carbon dioxide, which latter is released from the system together with the other inert gases entering as part of the gas mixture. The reaction of chlorine, sodium nitrite and sodium carbonate is of the non-reversible type fixing the chlorine constituent in the reaction products thus making it available for further use. The alkaline $NaNO_2$-$Na_2CO_3$ aqueous solution has the property of rapidly reacting with the chlorine gas with which it comes in contact and substantially completely removing the chlorine from the gas mixture. This factor is of considerable importance in the treatment of waste gases because it makes for economical operation and substantially complete elimination of chlorine from the waste gases prior to discharge into the atmosphere.

The accompanying drawing is a diagrammatic flow sheet illustrating the operation of the present invention.

Referring to the drawing, waste gases containing chlorine, generally about 5 to 20% by volume of chlorine resulting from venting of a chlorine manufacturing system and from purging of chlorine cylinders and tanks for loading with chlorine, are introduced through line 1 into the bottom of scrubber 2 which may be of any conventional design, as for example a spray tower, bubble-cap column or packed tower. An alkaline NaNO₂—Na₂CO₃ aqueous solution is introduced into the top of scrubber 2 through line 3 downwardly countercurrent and in intimate contact with the upwardly rising waste gases entering column 2 through line 1. Slightly elevated temperatures from about 30° C. to about 85° C., preferably 65–70° C., of the reactants in scrubber 2 tend to speed up the reaction. The desired temperature may be maintained in the tower by conventional heating and cooling means, not shown in the drawing. Tower 2 may be conveniently operated under substantially atmospheric pressure, higher pressures being found unnecessary. Control of the pressure on the tower may be obtained by regulating a release valve, not shown in the drawing, interposed in line 4.

As a result of the reaction between the chlorine in the waste gases with the sodium nitrite and sodium carbonate in the aqueous solution, carbon dioxide is evolved which together with other inert gases such as nitrogen, oxygen and water vapor are released from the top of scrubber 2 through line 4 and vented into the atmosphere. Analyses showed the residual gases leaving line 4 to be for the most part entirely free of chlorine with occasionally a slight trace of chlorine.

The concentration of sodium nitrite and sodium carbonate in the aqueous solution is important for obtaining efficient operation. With concentrations below 30 grams per liter of sodium nitrite, the solution is less effective for scrubbing the waste gases. Furthermore, and perhaps more important, if the solution contains less than 30 grams per liter sodium nitrite, absorption of chlorine results in the formation of some hypochlorite which is very corrosive to the equipment and otherwise objectionable. In practice, the concentration of sodium nitrite in solution has been increased up to 250 grams per liter and effective scrubbing of chlorine from the waste gases obtained throughout this range. However, the mixture of gases vented from the chlorine manufacturing process contains a small but appreciable percentage of nitrogen oxides which are valuable constituents and desirably recovered. In our experiments we noted that if the concentration of sodium nitrite in the aqueous solution was between 30 and 60 grams per liter, complete absorption of the valuable nitrogen oxide constituents in the solution was obtained, whereas, if the concentration of sodium nitrite in solution appreciably exceeded 60 grams per liter incomplete recovery of the nitrogen oxides resulted. Therefore, we prefer to maintain a concentration of 30 to 60 grams per liter sodium nitrite in our aqueous solution when scrubbing waste gases from the chlorine manufacturing plant. Another factor in the removal of nitrogen oxides is their state of oxidation. Specifically, we have discovered the alkaline nitrite solution serves best to remove nitrogen oxides when their state of oxidation is sufficiently high, that is, an oxidation level corresponding at least to $NO_2$. Oxidation of the nitrogen oxides may be accomplished in any convenient manner, as for example by the introduction of air through line 10 into scrubber 2; frequently the mixture of gases from the loading station entering through line 1 contains sufficient air adequate for this purpose. The aqueous solution containing sodium nitrite or if desired potassium nitrite should have sufficient sodium carbonate to maintain the pH of the solution at above 7, preferably above 8.5. An excess of sodium carbonate does not materially affect the operation; in general a solution having a concentration of from 40 to 190 grams per liter sodium carbonate will be satisfactory. Although we have found it convenient to supply alkalinity to the sodium nitrite solution by sodium carbonate, other alkalies such as NaOH, KOH may be employed.

The aqueous solution after reaction with the chlorine and containing sodium nitrate, sodium chloride, sodium nitrite and sodium carbonate is withdrawn from the bottom of scrubber 2 through line 5 and directed to scrubber tank 6 which functions as a surge and mixing tank. Since some of the sodium nitrite and sodium carbonate are consumed in scrubber 2, additional sodium nitrite solution and sodium carbonate solutions are introduced through lines 7 and 8 respectively into tank 6 in an amount sufficient to maintain the aqueous solution at the desired concentration. In order to avoid the accumulation of reaction products, particularly sodium nitrate and sodium chloride in the aqueous solution a small amount of the contents of tank 6 is withdrawn through line 9 and discharged from the system. In order to convey some order of the magnitude of the relative amount of reaction products withdrawn from the system, bleeding of one to eight gallons per minute of reaction products through line 9 when circulating the solution to tower 2 at the rate of about 150 gallons per minute will ordinarily be sufficient to maintain good operating conditions in the system.

The reaction products withdrawn through line 9 may be subjected to further treatment in the chlorine manufacturing plant or the salts may be recovered from solution by evaporation or by fractional crystallization.

Aqueous solution fortified by added sodium nitrite and sodium carbonate to maintain it at the desired concentration is withdrawn from scrubber tank 6 through line 11 and forced by pump 12 through line 3 into the top of scrubber 2 thereby completing the cycle.

A specific example for practicing the process in accordance with the present invention is as follows:

Waste gases containing 20% chlorine and 10% nitrogen oxides by volume and obtained from the manufacture of chlorine by the reaction of nitric acid with a metal chloride are introduced into the bottom of a packed tower at a temperature of 10° C. and at a rate of 50 cubic feet per minute, measured at standard conditions. A small stream of air is also fed into the bottom of the tower. Into the top of the tower is introduced an aqueous solution containing 50 grams per liter sodium nitrite and 100 grams per liter sodium carbonate at a temperature of 70° C. and at a rate of 150 gallons per minute. Residual gas released from the top of the tower contains no detectable amount of chlorine or nitrogen oxides. The aqueous solution after contact with the waste gases is withdrawn from the bottom of the tower and passed into a tank containing an accumulation of aqueous solution. From this tank 5 gallons per minute aqueous solution is withdrawn and discharged from the system. An aqueous solution containing 270 grams per liter sodium carbonate at the rate of 4 gallons per minute and an aqueous solution containing 260 grams per liter sodium nitrite at the rate of 1 gallon per minute are commingled with the solution in the tank. The resultant mixture in the tank is returned to the top of the packed tower at the rate of 150 gallons per minute as previously noted.

Although certain preferred embodiments of the invention have been disclosed for purpose of illustration, it will be evident that various changes and modifications may be made therein without departing from the scope and spirit of the invention.

We claim:

1. A process for the removal of chlorine from gases containing the same which comprises passing said gases in intimate contact with an alkaline solution containing an alkali and 30 to 250 grams per liter of a nitrite.

2. A process for the removal of chlorine from gases containing the same which comprises passing said gases in intimate contact with an alkaline $NaNO_2$-$Na_2CO_3$ aqueous solution containing 30 to 250 grams per liter $NaNO_2$.

3. A process for the removal of chlorine from gases containing the same which comprises passing said gases in intimate contact with an alkaline $NaNO_2$-$Na_2CO_3$ aqueous solution having a concentration of 30 to 60 grams per liter $NaNO_2$.

4. A process for the removal of chlorine and nitrogen oxides from gases containing the same which comprises passing said gases in intimate contact with an alkaline solution containing an alkali and 30 to 60 grams per liter of an alkali metal nitrite.

5. A process for the removal of chlorine and nitrogen oxides in a state of oxidation below $NO_2$ from gases containing the same which comprises oxidizing the nitrogen oxides to an oxidation level corresponding at least to $NO_2$ and passing the gases in intimate contact with an alkaline solution containing an alkali and 30 to 60 grams per liter of an alkali metal nitrite.

6. A process for the purification of waste gases containing chlorine and nitrogen oxides which comprises passing said gases in the presence of free oxygen in intimate contact with an alkaline $NaNO_2$-$Na_2CO_3$ aqueous solution containing 30 to 60 grams per liter $NaNO_2$ and 40 to 190 grams per liter $Na_2CO_3$ at a temperature within the range of 30° to 85° C. thereby effecting substantially complete removal of the chlorine and nitrogen oxide constituents from the gases, and discharging the residual gases substantially free from chlorine and nitrogen oxides.

7. A process for the removal of chlorine from gases containing the same which comprises passing said gases in intimate contact with an alkaline aqueous solution containing a nitrite and an alkali, discharging the residual gas containing substantially no chlorine after contact with the aqueous solution, withdrawing the aqueous solution after contact with the gas mixture and recirculating the withdrawn aqueous solution for further intimate contact with the gases containing chlorine, bleeding off a small portion of the circulating aqueous solution and maintaining the concentration of the circulating aqueous solution by the addition thereto of an alkali metal nitrite and an alkali.

8. A process for the purification of waste gases containing chlorine and nitrogen oxides which comprises passing said gases upwardly in the presence of free oxygen in intimate contact with a downwardly flowing stream of alkaline $NaNO_2$-$Na_2CO_3$ aqueous solution containing from 30 to 60 grams per liter sodium nitrite and from 40 to 190 grams per liter sodium carbonate at a temperature within the range of 30 to 85° C., releasing the residual gas containing substantially no chlorine and nitrogen oxide constituents after contact with the aqueous solution, withdrawing the aqueous solution after contact with the gas mixture and recirculating the withdrawn aqueous solution for further contact with the incoming gases containing chlorine and nitrogen oxides, bleeding off a small portion of the circulating aqueous solution and maintaining the concentration of the circulating aqueous solution by the addition thereto of sodium nitrite and sodium carbonate.

9. A cyclic method for the purification of waste gases such as vent gases from a chlorine process and purge gases from a chlorine loading station which comprises continuously passing said waste gases in a first zone upwardly in the presence of free oxygen in intimate contact with a continuously downwardly flowing stream of an alkaline $NaNO_2$-$Na_2CO_3$ aqueous solution containing from 30 to 60 grams per liter sodium nitrite and from 40 to 190 grams per liter sodium carbonate at a temperature between 65 to 70° C. and at substantially atmospheric pressure, continuously discharging the residual gases from the first zone into the atmosphere after contact with the aqueous solution, continuously withdrawing the aqueous solution after contact with the waste gases and directing said withdrawn aqueous solution into a second zone wherein said withdrawn aqueous solution is accumulated, continuously withdrawing a small portion of the aqueous solution from the second zone, continuously feeding into the second zone an aqueous solution of sodium nitrite and an aqueous solution of sodium carbonate sufficient to maintain the aqueous solution at the desired concentration and continuously circulating the thus fortified aqueous solution from the second zone to the first zone for further contact with the waste gases.

WILLIAM J. CONGDON.
CHARLES F. WESTON.

References Cited in the file of this patent

UNITED STATES PATENTS

| Number | Name | Date |
|---|---|---|
| 521,629 | Worsley | June 19, 1894 |
| 910,530 | Halvorsen | Jan. 26, 1909 |
| 1,029,528 | Bosch et al. | June 11, 1912 |
| 1,903,815 | Handforth | Apr. 18, 1933 |
| 2,057,957 | Kaselitz | Oct. 20, 1936 |
| 2,157,525 | Cady | May 9, 1939 |
| 2,211,531 | Beekhuis | Aug. 13, 1940 |
| 2,273,723 | Muskat | Feb. 17, 1942 |
| 2,296,328 | Beekhuis | Sept. 22, 1942 |
| 2,296,762 | Beekhuis | Sept. 22, 1942 |

FOREIGN PATENTS

| Number | Country | Date |
|---|---|---|
| 2,678 | Great Britain | 1875 |

OTHER REFERENCES

Perry: Chem. Engineers' Handbook, pages 706–707, 3rd Edition, McGraw-Hill Book Co., N. Y., 1950.